(12) United States Patent
Schmitt et al.

(10) Patent No.: US 7,040,122 B2
(45) Date of Patent: May 9, 2006

(54) PROCESS FOR PRODUCTION OF MOLTEN GLASS

(75) Inventors: Stefan Schmitt, Stadecken-Elsheim (DE); Rule Kirchhoff, Nackenheim (DE); Wilfried Linz, Mainz (DE); Norbert Osterhage, Ingelheim (DE); Gerhard Lautenschläger, Jena (DE); Andreas Sprenger, Mainz (DE); Klaus-Dieter Duch, Taunusstein (DE); Frank Karetta, Dittelsheim-Hessloch (DE); Ludwig Dürsch, Mainz (DE); Rainer Eichholz, Mainz (DE)

(73) Assignee: Schott AG, Mainz (DE)

( * ) Notice: Subject to any disclaimer, the term of this patent is extended or adjusted under 35 U.S.C. 154(b) by 83 days.

(21) Appl. No.: 10/223,479

(22) Filed: Aug. 19, 2002

(65) Prior Publication Data

US 2003/0066314 A1    Apr. 10, 2003

(30) Foreign Application Priority Data

Aug. 20, 2001 (DE) ................................ 101 39 887

(51) Int. Cl.
*C03B 5/182* (2006.01)
(52) U.S. Cl. ................... 65/135.1; 65/135.7; 65/347
(58) Field of Classification Search ............... 65/135.1, 65/135.2, 135.7, 339, 337, 347; 373/30, 373/35
See application file for complete search history.

(56) References Cited

U.S. PATENT DOCUMENTS

| | | | | |
|---|---|---|---|---|
| 2,902,524 A * | 9/1959 | Paxton | ............ | 373/40 |
| 3,160,692 A * | 12/1964 | Paxton | ............ | 373/32 |
| 3,742,111 A * | 6/1973 | Pieper | ............ | 373/41 |
| 3,937,624 A | 2/1976 | Heitzel et al. | ............ | 65/135 |
| 4,029,887 A * | 6/1977 | Spremulli | ............ | 373/32 |
| 4,352,687 A | 10/1982 | Boettner | ............ | 65/134 |
| 4,365,987 A | 12/1982 | Boettner | ............ | 65/137 |
| 4,426,217 A * | 1/1984 | Farrar et al. | ............ | 65/135.8 |
| 4,737,966 A * | 4/1988 | Palmquist | ............ | 373/41 |
| 4,929,266 A * | 5/1990 | Cozac et al. | ............ | 65/134.5 |
| 5,447,547 A * | 9/1995 | Goldfarb et al. | ............ | 65/134.1 |
| 5,785,726 A | 7/1998 | Dorfeld et al. | ............ | 65/134.1 |
| 6,044,667 A | 4/2000 | Chenoweth | ............ | 65/540 |
| 6,227,007 B1 | 5/2001 | Palmquist | ............ | 65/26 |
| 2002/0159497 A1 * | 10/2002 | Duch et al. | ............ | 373/30 |

FOREIGN PATENT DOCUMENTS

| | | | |
|---|---|---|---|
| DE | 1080740 | * | 4/1960 |
| DE | 23 62 565 | | 6/1975 |
| DE | 38 24 829 | | 1/1990 |
| DE | 100 16 872 | | 10/2001 |
| EP | 0 275 173 | | 8/1991 |

(Continued)

OTHER PUBLICATIONS

Machine Translation of JP 11-343124, 6 pages.*

(Continued)

*Primary Examiner*—Steven P. Griffin
*Assistant Examiner*—Carlos Lopez
(74) *Attorney, Agent, or Firm*—Baker & Daniels

(57) ABSTRACT

The invention concerns a process and a device from the production of molten glass.

According to the invention, measures will be taken to lead the current of the molten glass through the tank furnace so that cutoffs of the glass current between the surface of the glass bath, on the one hand, and the outlet opening on the other hand are avoided and a an equal holding period of all melt particles in the tank furnace is achieved.

6 Claims, 2 Drawing Sheets

FOREIGN PATENT DOCUMENTS

| | | | |
|---|---|---|---|
| EP | 0 173 355 | | 9/1991 |
| GB | 627863 | * | 8/1949 |
| JP | 52-107017 | | 9/1977 |
| JP | 11-343124 | * | 12/1999 |

OTHER PUBLICATIONS

Tatevosyan, K.M.: "Electrically Heated Glass Melter—Has Top Tier Electrodes Pair Fed by Separate Transformers and All Bottom Tier Fed by One Transformer", Soviet Inventions Illustrated, Section CH: Chemical, Derwent Publications Ltd., vol. 84, Nr. 8., Apr. 15, 1983.

Tatevosyan, K.M.: "Electric Glass-Founding Furnace—Has Cover of Metal Fitted on Baffle Top and Resistant to High Temp. Molten Glass" Sovient Inventions Illustrated, Section CH: Chemical, Derwent Publications Ltd., vol. 83, Nr. 34, Oct. 23, 1982.

* cited by examiner

PROCESS FOR PRODUCTION OF MOLTEN GLASS

The invention concerns a process and a device for the production of molten glass. A device for the production of molten glass normally has a rectangular design. The device comprises a tank furnace with peripheral walls and a floor. The tank furnace is heated with fossil fuel and has an outlet. Above the outlet the tank furnace has an open glass bath surface. Please refer to the reference work "Molten Glass Furnaces" by W. Trier, Springer Verlag Berlin, 1984.

Tank furnaces of this type can be equipped with installations such as overflow guards or a bridge guard.

The heat source is a so-called upper furnace heater that uses a burner. Sometimes supplemental electrical heating of the molten glass is also designated. An outlet for the molten glass is located in a sidewall.

On the surface of the silicate molten glass (alkali-,earth alkaline-silicate molten glass, alkali-borosilicate molten glass, alumino-boron molten glass, ceramic molten glass, etc.), $SiO_2$ forms in the melting units, which are heated by burning fuels, in rich, tough layers of varying thickness, depending on, among other things, the type of glass, the upper furnace temperature and the throughput rate. Due to the increase of primarily $SiO_2$ and the decrease of other easily evaporated glass components (e.g. alkali or boric acids), these layers exhibit reduced density compared to the base glass. Due to the high proportion of $SiO_2$, these layers have very high viscosity and float in a relatively stationary and immobile position on the surface of the molten glass. The layers occur primarily in the areas where the glass surface is actually supposed to be shiny, i.e. in the area of the refining bath or before discharge.

The unwanted intake of parts of this layer along with the withdrawal flow into the discharge area introduces tough surface glass, with its different composition, into the base glass. It is not possible to mix, or dissolve, this tough glass evenly with the base glass during the subsequent conditioning and homogenizing steps. The uneven composition causes streaks and lumps of the tough surface glass to form in the glass, which leads to a decrease in quality or a stoppage of production.

DE 38 24 829 concerns the prevention of fireproof corrosion and the equalization of temperature differences in a melt aggregate through the use of molybdenum pipes arranged concentrically in the melt basin. The intake of lumps via the mechanism described above cannot be achieved in this arrangement; on the contrary: pushing the inner pipe very far in the direction of the glass surface will still allow intake of the surface layer, which has been deprived of glass components and will still enable lump formation.

EP 0 275 173 and U.S. Pat. No. 4,029,887 describe, respectively, inductive and electrically heated refractory metal pipes for conditioning of molten glass after the actual melting and refining procedure. The essential element of both inventions is the ability to heat molten glass in the pipe. This allows setting of a desired temperature profile after leaving the refining bath. The main application area of these inventions is for use in the feeding system of the melting unit. The disadvantage of this design is the absent blocking effect against current that contains lumps, which can get directly into the pipe from the surface of the melting unit.

In U.S. Pat. No. 6,044,667, the physical position of the hot spot is influenced by the strategic placement of heating elements. The goal is shift the hot hotspot away from the side walls and floor of the melting unit in order to reduce and equalize corrosion. This prevents an accelerated fireproof wear and tear. The configurations described in the patent are not suited for influencing lumps.

U.S. Pat. No. 5,785,726 addresses a method to avoid a special type of bubbling on refractory metal pipes flowing through glass by setting specific partial pressure of hydrogen on the pipe exterior. This has no effect on the lumps. Information about design variations of the constructed shape of the discharge area of melting units that prevent intake of corrosive products and/or surface glass into the pipe is not provided.

U.S. Pat. Nos. 4,365,987 and 4,352,687 discuss feeding systems for molten glass. The goal is to control throughput and temperature homogenization of the molten glass that is attained through heating. A connection to glass quality with respect to fireproof corrosive products or lumps from the melting unit is not established.

EP 0 173 355 concerns the corrosion protection of fireproof material in a melting unit. This is attained through lining the palisade stones with metals from a refractory metal such as molybdenum. This also has no effect on dissolving lumps.

U.S. Pat. No. 6,227,007 addresses sunken discharges lined with refractory metal. The design presented is supposed to prevent the intake of fireproof corrosive products. But because the sunken discharge opens upward, glass that contains lumps can proceed on the direct path from the surface melt into the discharge.

Tank furnace discharges made of ceramic material are known on the market from the prospectuses of various manufacturers (for example, "Tank furnace Installations and Accessory Parts", Prospectus Fa. Plansee), which are reinforced internally with molybdenum. After the relatively quick dissolving of the ceramic material, the then free-lying molybdenum reinforcement prevents further corrosion in the highly burdened discharge area. All of the designs presented, however, show the disadvantage of the absent blocking effect of the presented flow executions opposite downward currents from the melt surface that contain lumps.

To obtain impeccable quality it is absolutely imperative that completely melted, homogenous and refined (bubble-free) glass exits the outlet and that quantities or portions of yet unmelted glass with a deviating composition do not come through. Even small quantities of faulty glass are not acceptable with respect to the desired glass quality.

All efforts will be undertaken toward these ends.

So it has already been attempted improve insulation of the outlet wall so that the area in front of this wall can be maintained at higher temperatures and the existing downward current there can be reduced. Such a downward current materializes, as a rule, from two current rollers. See FIG. 3. However, the increased temperature of the outlet wall leads to higher wear and tear on the outlet and necessitates cooling.

For tank furnaces with installations (guards) and/or a supplemental electrical heating source to increase melting performance, the current rollers look different than what is shown in FIG. 3. Despite that, the downward current in front of the flow wall occurs as a rule.

Another possibility for avoiding intake of surface glass into the throughput current is attempting to draw the surface glass away to overflow drains. The disadvantage of this method, however, is that a portion of the melted glass is lost for use in the finished product. In addition, this method cannot guarantee that surface glass will no longer enter the throughput current.

The task of the invention is to create a process for melting glass using a melting bath in which the molten glass displays, for the most part, a shiny surface and is thereby free of batches, that the complete melting of the batches and complete refinement and homogenization of the glass is achieved, and that not even the tiniest batch portion or portions of glass with deviating composition or glass containing bubbles get through the outlet and make their way into the product along with the other glass flow.

This task will be performed by means of the independent claims.

The inventors have recognized the following:

In the area of the peripheral wall that contains the outlet, a strong downward current builds. It is possible that this current will allow batches that have not been completely melted, or glass with deviating composition, or glass that has not been completely refined, to enter the withdrawal current into the outlet directly, which will cause the negative consequences described earlier.

Due to the open surface of the glass bath, some types of glass may form a surface layer that has a different composition from the rest of the glass bath. This is especially true of borosilicate glasses.

Due to the characteristic downward current in front of the outlet wall, it is common for surface glass to enter the throughput current and, in a short distance, reach the outlet. Due to the short distance, there is no longer sufficient time for homogenization of the glass and surface glass taken in (which certainly has a deviating composition) leads to lumps and/or streaks in the product and, therefore, to a production stoppage.

A comparable problem exists when there are batches in front of the outlet wall that have not been completely melted. These can also be caught up in the throughput current and make their way over the short distance to the outlet. Due to the short distance, there is no longer sufficient time to completely melt the batch, which leads to defects in the product in the form of stones and or batch remnants.

A similar problem exists when there is foam and or bubbles in front of the outlet wall. Parts of the foam, or bubbles, can get into the throughput current and travel the short distance to the outlet and also lead to glass defects in the product because there is insufficient time for the bubbles to rise.

The invention will also solve the following problems:

It will help prevent glass portions from the surface of the melt bath, which is some circumstances have a different composition from the rest of the melt bath, from getting into the outlet and causing lumps or streaks in the product.

Furthermore, complete melting of the batch will be guaranteed; no product defects in the form of stones or batch remnants will occur.

Finally, the formation of foam, bubbles, lumps and streaks will be prevented, which could allow foamy or bubble-filled glass to enter the outlet and thereby enter the product.

To solve the task, the inventors propose the following solutions, which can be applied independently or in combination.

The first solution is the following:

Above the outlet, a cover for the area located below is planned so that the downward current is guided around in front of the outlet wall.

This prevents batch portions that have not been completely melted, as well as glass with a deviating composition, and bubble-filled glass from the area above the duct, from getting directly into the outlet. This achieves perfect glass quality, assuming that all other parameters are in order.

The cover mentioned can be particularly advantageous in combination with a sunken outlet or canal that is located under the actual floor of the tank furnace.

Fireproof materials (metallic or non-metallic) with low corrosion, high durability, low cost and a low potential for glass defects can be used as a material for the said cover. Refractory metals such as molybdenum or wolfram and their alloys will work well.

A second solution is to set up a screen. This way the discharge or discharge area will be lined with a metal, a case, a pipe, or a similar prefabricated part made of refractory metal that can withstand high temperatures and is inert to the respective molten glass, whereby the part extending from the discharge wall must project a specific amount into the melt and refining bath and the discharge (area) is routed off in the direction of the melt surface. A length between 200 and 1000 mm for the refractory metal part would be advantageous.

The thickness of the prefabricated part is based on mechanical stress and ranges, for example, from 4–20 mm of wall thickness for molybdenum. Because of the mechanical screening provided, supplemental heating of the prefabricated part is not required.

Due to the temperature difference between the cold wall and the hot glass volume, a strong downward current forms against each discharge wall. This takes portions of the surface layer with it that go immediately and directly into the current and into the discharge.

Due to the mechanical blocking effect of the discharge lining that extends into the melt, the downward current that contains lumps can no longer get into the discharge, but is forced back into the melt or refining bath. At the high temperatures of the molten glass in the refining bath, and the extension of the holding period, the lumps and streaks brought in are dissolved well in the glass matrix and no longer have a negative impact on the glass quality. In the simplest case, sheet metal that projects a small amount into the melting unit is sufficient for use as a discharge lining; however, more complicated constructions could also be used and, in some circumstances, would make sense.

The prefabricated part for the discharge lining is constantly exposed to high temperatures and strong glass currents due to its comprehensive glass contact. A ceramic prefabricated part is not suited for this task because each ceramic fireproof material fails after a short time due to the particularly intensive corrosive effect of the molten glass in this location and due to its gradual dissolving leads to streaks and small stones in the glass that, just like lumps, can no longer be dissolved in the subsequent conditioning and homogenization steps. Therefore, an inert refractory metal must be selected to withstand the molten glass. The metal must therefore not dissolve in the molten glass, react with the molten glass or break off into metallic pieces or strips. The preferred refractory metals are Mo or W, but also Pt, Ir, Pd, Au, Ta and/or alloys of these metals.

If necessary, the discharge lining can be combined with a depression (holding basin) in front of the discharge in order to collected fireproof corrosive products in the holding basin or draw them away through floor drains installed for that purpose. This way these materials will not be drawn into the current, through the discharge and into the product.

In another execution, the refractory metal prefabricated part can be arranged to extend above the tank furnace floor somewhat to achieve the same effect. Of particular advantage would be a height between 50 and 250 mm above the tank furnace floor. To prevent back currents, a sunken discharge, for example, can be combined with the refractory metal prefabricated part to exploit the advantages of both systems.

A molybdenum pipe that projects a half meter into the refining bath is sufficient to achieve an significant improvement in the glass quality with respect to lumps and streaks. The downward current on the significantly cooler discharge wall, compared with the molten glass, will be forced once again into the refining bath. The direct intake of lumps from the surface into the discharge will thereby be suppressed; the constantly cooler discharge wall no longer plays a negative role with respect to the discharge current. The significantly longer holding time in the refining bath also makes it possible to achieve improved dissolving of lumps that have been brought in from the surface.

Another advantage of the invention is that the loss of glass that occurs when the surface layer is drawn away via drains is avoided. In addition, the otherwise usual corrosion experienced by ceramic discharges into the molten glass over time is suppressed by the use of a refractory metal that is inert to the molten glass.

A third solution is as follows:

In the area of the exhaust canal, a supplemental heating source is installed, preferably in the area above the outlet where the glass current leaves the tank furnace. The effect of this supplemental heating source consists in constructing a thermal barrier that reduces the downward current or completely suppresses it. This prevents mixtures that have not been completely melted or glass of a deviating composition, or glass that has not been completely refined, from getting directly into the outlet.

In each case, there is a vault that is heated by fossil fuel in the space of the upper furnace that contains the burner. It appears, for the most part, as a shiny glass surface through which energy from the heated vault enters into the glass bath.

The invention, as well as the status of existing technology, is explained in greater detail using the illustrations. The following describes the illustrations:

Figure 1:
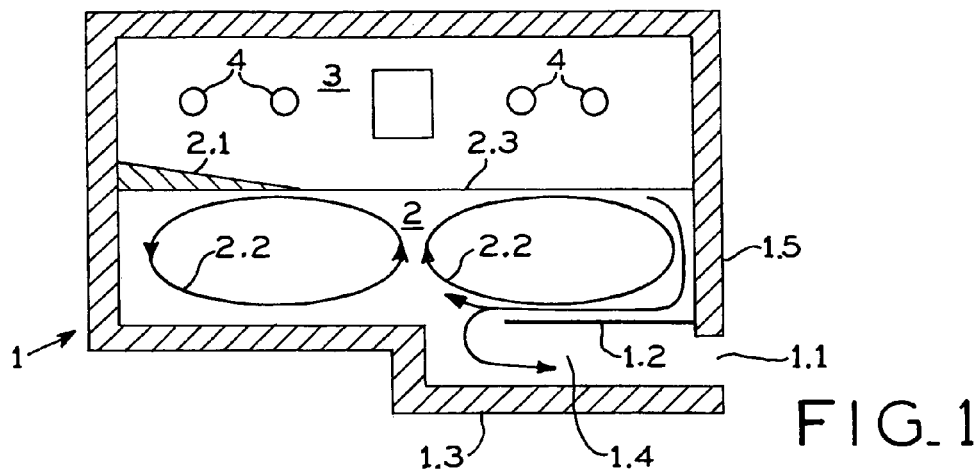
FIG. 1 shows a schematic sketch of a melting tank furnace according to the first execution form of the invention.
Figure 2:
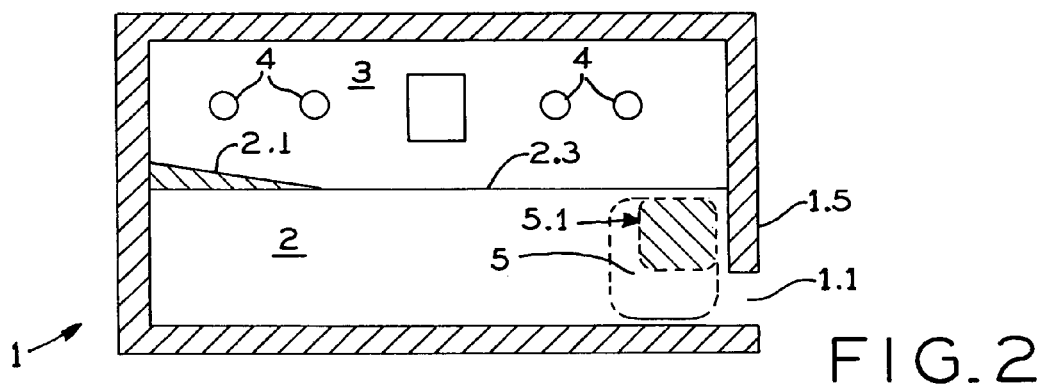
FIG. 2 shows a schematic sketch of a melting bath according to the second execution form of the invention.

The invention-related device presented in FIGS. 1 and 2 shows a melting bath 1. The melting tank furnace contains a melting bath 2. This bath is fed by mixtures 2.1 that are added to the melting tank furnace 1 at a specific location. Above the melting tank furnace 2 there is an upper furnace space 3. This contains the burner 4 presented in the illustration through which heat is transferred to the melt bath 2.

Diametrically opposed to the incoming mixtures 2.1 there is an outlet opening 1.1 in the melting tank furnace.

In execution form illustrated by FIG. 1, there is a sunken outlet with a canal 1.4 and a cover plate 1.2.

As can further be seen, a rolling current pattern forms in the melt bath. Direct discharge of the surface of the glass bath through the outlet opening 1.1 is prevented by the cover plate 1.2 above the outlet canal 1.4 and in front of the outlet opening 1.1. The cover plate 1.2 thereby prevents surface glass drawn in by the downward current in front of the outlet wall 1.5 from immediately entering the outlet opening 1.1. The glass must take a "detour" that is forced by the cover plate 1.2. This allows more time for homogenization and dissolving of lumps and/or streaks. In addition, correct sizing of the cover plate 1.2 will allow trapping of a portion of the glass from the rolling current, which will lead to an extension of the wait time in the tank furnace 1 and will thereby produce better homogenization and dissolving of lumps and/or streaks.

The execution form illustrated in FIG. 2 has a supplemental heating source. This is placed on an area 5 indicated by dashes or preferably in the hatched area 5.1.

This (electrical) additional heating source in front of the outlet opening 1.1 causes local heating of the melt in this area. This creates a thermal barrier that obstructs the downward current. It decreases the speed of the downward current or suppresses such a current completely.

Such current control allows less surface glass to be taken in due to the lower speed of the downward current. It also extends the time span that the surface glass taken in needs to reach the outlet opening 1.1. Therefore, there is more time available for homogenization and dissolving of lumps and/or streaks.

The heated area of the electrical additional heating source may be brought about by poles, plates, block or calotte electrodes. These may be used as side electrodes (to the left of, to the right of, or in the outlet wall 1.5), or else as top electrodes or bottom electrodes.

It is advantageous to build the heated area so as to concentrate the heat output in front of the outlet opening 1.1. The heat output should not be distributed over a broad area of the glass bath. 2. For example, this may be achieved by arranging the heated area diagonal to the final direction of the glass. This means that the heated area in the most extreme case will be twice as wide as the outlet opening 1.1.

In addition it is advantageous to shape the heated area in such a way that the heat output is released primarily above the outlet opening 1.1. This may be achieved using side or top electrodes, for example, that are arranged at an appropriate height.

Figure 3:
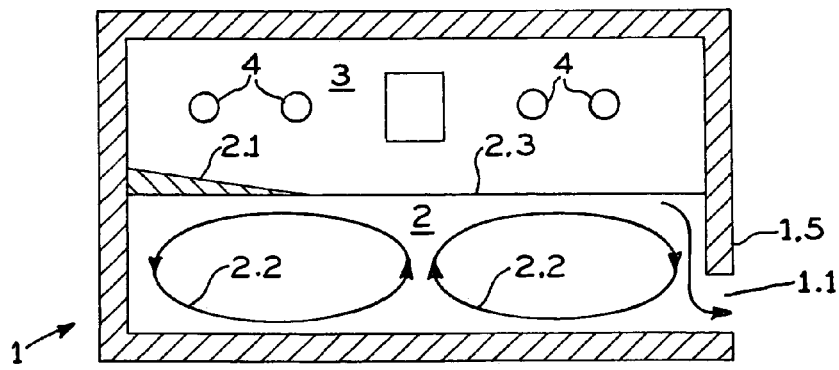
FIG. 3 shows a schematic sketch of a melting bath according to the status of existing technology.

The execution form illustrated in FIG. 3 belongs to the status of existing technology. The current rollers 2.2 are recognizable. The throughput current through the tank furnace 1 also overlaps the current rollers. Due to the rolling current and the overlapping throughput current, there is a prominent downward current in front of the outlet wall 1.5.

Here installations such as guards and/or an electrical supplemental heating source for increasing melting performance do not change anything fundamentally. The current rollers look different that as they appear in FIG. 3. The downward current in front of the outlet wall 1.5 still occurs.

FIG. 4 shows five variations of a possible execution form and arrangement of a screen 1.2 that serves to prevent direct discharge of surface glass melt 2.3 through the outlet opening 1.1. See variation A through E.

Figures 4A, 4B, 4C, 4D, 4E:
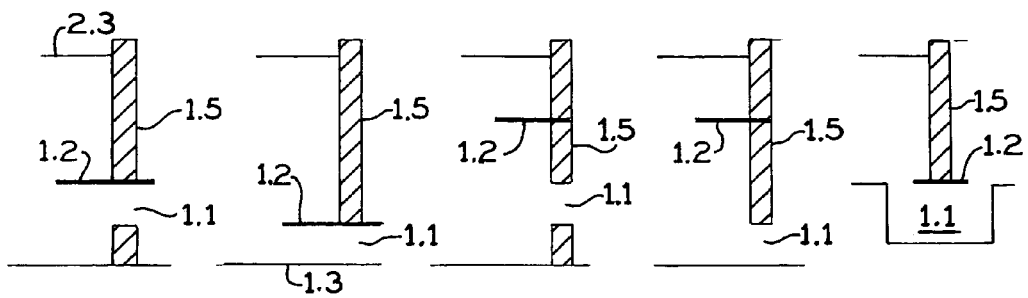
FIGS. 4A–4E illustrate different configurations of a refractory metal prefabricated part.

The screen 1.2 consists of a refractory metal. It consists of a sheet of metal 1.2, which is located at various geodetic heights in the illustration variations. The variation shown in FIG. 4A illustrates the span of the sheet metal through the outlet opening 1.1. It thereby stands on both sides of the outlet wall 1.5 of the tank furnace. This means that it projects into the melt. It rests directly against the support of the outlet opening 1.2.

FIG. 4B illustrates a similar situation. Here, however, the outlet opening 1.1 is located further down, directly above the floor 1.3 of the tank furnace.

For execution forms illustrated in FIGS. 4C and 4D, the sheet metal is set into the outlet wall 1.5. It projects into the melt.

The execution for illustrated in FIG. 4E uses a depressed discharge.

Figure 5F:
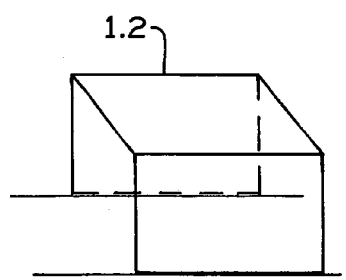
FIGS. 5F and 5G illustrate a case-shaped refractory metal prefabricated part.
Figure 5G:
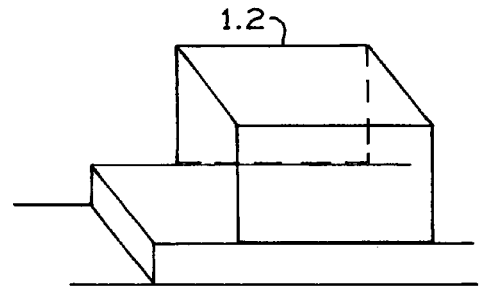

FIGS. 5F and 5G illustrate special execution forms for using a screen as a means to prevent a direct discharge of melt material from the glass surface to the outlet opening. The screen consists of a refractory metal.

The execution forms illustrated by FIGS. 6H through K have a screen 1.2 displayed in perspective in the form of a pipe connector. Therefore, it sticks through the outlet opening. It projects on both sides of the outlet wall 1.5, both on the sided touched by the melt as well as the exterior side. The pipe connector rests on the support of the outlet opening and thereby lines the opening.

Figures 6H, 6I, 6J, 6K:
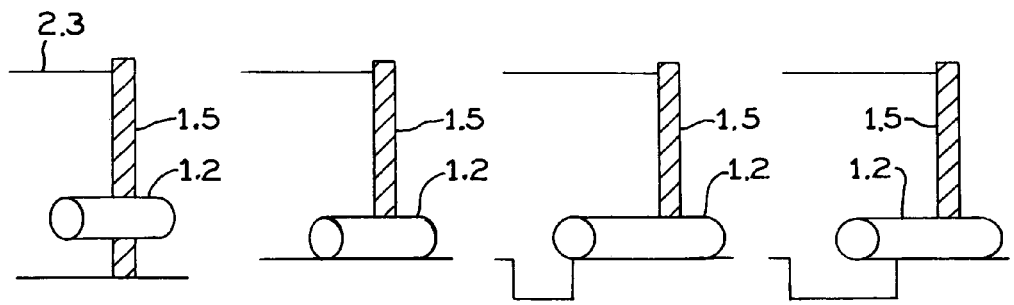
FIGS. 6H–6K illustrate a pipe-shaped refractory metal prefabricated part.

FIGS. 6J and 6K also show a depressed discharge.

Figure 8:
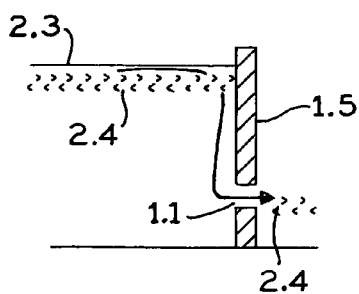
FIG. 8 shows a conventional discharge construction.
Figure 7:
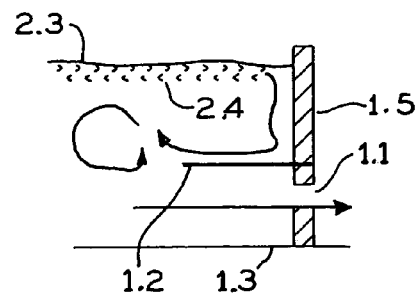
FIG. 7 shows the effect of a refractory prefabricated part on the melt current.

FIGS. 7 and 8 are intended to illustrate the different effects of the invention on the one hand and the status of current technology on the other.

The execution for illustrated in FIG. 7 shows the familiar glass surface (mirror) 2.3. A downward current forms in front of the outlet wall. The melt current along with the lumps it contains is thereby initially directed downward. The current is redirected by the refractory prefabricated metal part into the melt bath. In this way the lumps 2.4 are dissolved. Homogenization is improved.

Otherwise the execution form shows a conventionally constructed tank furnace as in FIG. 8. There the melt flows directly from the glass bath surface 2.3 to the outlet opening 1.1. The lumps 2.4 contained in the glass bath surface make their way through the outlet opening 1.1.

The invention claimed is:

1. A process for producing silicate molten glass from mixtures or fragments comprising the following process steps:

the mixture or the fragments are poured into a tank furnace that is heated by fossil fuel and are melted down to form a glass melt, the tank furnace including a tank floor and an outlet opening, the melt in the tank including an open surface layer above the outlet opening;

the melt is released from the tank furnace through the outlet opening thereby forming a melt current; and measures are taken to lead the melt current through the tank furnace so as to avoid cuts of the surface layer from discharging through the outlet opening and to achieve a sufficient residence time for all melt particles in the tank furnace;

wherein the outlet opening is depressed lower than the floor of the tank furnace and a screen formed of a sheet metal made of a refractory metal is placed above the outlet opening; and wherein the screen reroutes the current of the melt in the area in front of the outlet opening.

2. The process described in claim 1 further including the step of supplementally heating the melt in the area of the outlet opening.

3. A process for producing silicate molten glass from mixtures or fragments comprising the following process steps:

the mixture or the fragments are poured into a tank furnace that is heated by fossil fuel and are melted down to form a glass melt, the tank furnace including a tank floor and an outlet opening, the melt in the tank including an open surface layer above the outlet opening;

the melt is released from the tank furnace through the outlet opening thereby forming a melt current; and measures are taken to lead the melt current through the tank furnace so as to avoid cuts of the surface layer from discharging through the outlet opening and to achieve a sufficient residence time for all melt particles in the tank furnace;

wherein the outlet opening is depressed lower than the floor of the tank furnace and a screen formed of a sheet metal made of a refractory metal is placed above the outlet opening; and wherein the current is initially in a downward direction toward the outlet opening, and the screen decreases the speed of the current in the downward direction and redirects the current in front of the outlet opening, thereby preventing cuts of the surface from entering the outlet opening.

4. The process described in claim 3 wherein the tank furnace further includes a supplemental heating source, the supplemental heating source heating the melt in the area of the outlet opening, thereby creating a thermal barrier that decreases the speed of the current in the downward direction and provides increased residence time for the melt particles.

5. A process for producing silicate molten glass from mixtures or fractions, the process comprising the following steps:

the mixture or fractures are added to a specific location in a tank furnace that is heated by fossil fuel and re melted down to form a glass melt, the tank furnace including a tank floor and an outlet, the melt in the tank including an open surface layer above the outlet opening;

the melt is released from the tank furnace through the outlet opening thereby forming a melt current; and measures are taken to lead the melt current through the tank furnace so as to avoid cuts of the surface layer from discharging through the outlet and to achieve a sufficient residence time for all melt particles in the tank furnace;

wherein the outlet opening is elevated above the floor of the tank furnace and a screen formed of a sheet metal made of a refractory metal is placed above the outlet opening; and wherein the screen reroutes the current of the melt in the area in front of the outlet opening.

6. A process for producing silicate molten glass from mixtures or fractions, the process comprising the following steps:

the mixture or fractions are added to a specific location in a tank furnace that is heated by fossil fuel and re melted down to form a glass melt, the tank furnace including a tank floor and an outlet, the melt in the tank including an open surface layer above the outlet opening;

the melt is released from the tank furnace through the outlet opening thereby forming a melt current; and measures are taken to lead the melt current through the tank furnace so as to avoid cuts of the surface layer from discharging through the outlet and to achieve a sufficient residence time for all melt particles in the tank furnace, wherein the outlet opening is elevated above the floor of the tank furnace and a screen formed of a sheet metal made of a refractory metal is placed above the outlet opening, and wherein the current is initially in a downward direction toward the outlet opening, and the screen decreases the speed of the current in the downward direction and redirects the current in front of the outlet opening, thereby preventing cuts of the surface from entering the outlet opening.

* * * * *